United States Patent [19]
Chaffee

[11] 3,797,594
[45] Mar. 19, 1974

[54] TRAILER TONGUE WEIGHT SCALE

[76] Inventor: James L. Chaffee, 4308 San Bernardino Ave., Las Vegas, Nev. 89102

[22] Filed: July 20, 1973

[21] Appl. No.: 381,115

[52] U.S. Cl. .................................. 177/136, 177/208
[51] Int. Cl. ........................ G01g 19/08, G01g 5/04
[58] Field of Search ............ 177/136, 141, 146, 208

[56] References Cited
UNITED STATES PATENTS

| | | | |
|---|---|---|---|
| 3,700,053 | 10/1972 | Glissendorf | 177/136 |
| 2,970,820 | 2/1961 | Sepich | 177/136 X |
| 3,669,756 | 6/1972 | Bradley | 177/136 |

Primary Examiner—George H. Miller, Jr.
Attorney, Agent, or Firm—A. Yates Dowell, Jr.

[57] ABSTRACT

Apparatus carried by the tongue of a trailer to indicate the tongue weight load and thereby assist in distributing the weight of the cargo during the loading of the trailer to provide optimum conditions for the trailer and the propelling vehicle.

4 Claims, 5 Drawing Figures

PATENTED MAR 19 1974

3,797,594

TRAILER TONGUE WEIGHT SCALE

BACKGROUND OF THE INVENTION

1. Field of the Invention

This invention relates generally to trailers of various kinds and the relationship between the trailer and a propelling vehicle, and relates particularly to apparatus for indicating the dead weight load of the trailer tongue and the weight distribution of the cargo during the loading of the trailer.

2. Description of the Prior Art

Heretofore many weighing devices have been provided to determine the weight of cargo being loaded onto a trailer or other vehicle and these devices have included resilient members such as springs, fluid pressure operated diaphragms, and the like. Most of these prior art devices have been for use with relatively large tractor trailer rigs or multi-axle trailers and were used primarily to determine the weight of the cargo so that the vehicle did not exceed the gross weight limit in order to avoid damage to the vehicle and to the roads over which the vehicles travel. Also overweight vehicles are subject to fines levied by the roads commission of various states and other political subdivisions. Examples of this type of structure are disclosed in the U.S. Pat. Nos. to Huston et al. 2,452,124 and Woodburn 3,241,626.

Some efforts have been made to determine the dead weight load and the cargo weight distribution of a relatively small trailer such as disclosed in the U.S. Pat. No. to Glissendorf 3,700,053. This structure appears complicated and difficult to produce and maintain and to require that the basic structure of the vehicle tongue must be altered in order to accommodate the weighing device. Additionally, the strength of the tongue of the towed vehicle has been substantially reduced since portions of the tongue have been joined together by a single pin to permit movement of one portion relative to the other.

SUMMARY OF THE INVENTION

It is desirable to measure the dead weight load on a trailer tongue as well as the weight distribution of the cargo of a relatively small trailing vehicle of the type to be towed behind an automobile or the like. Most trailers which are pulled by small propelling vehicles normally are supported by a single axle having one or two road-engaging wheels at each end depending upon the size of the trailer as well as the weight of the anticipated load. Most trailers of this type normally are connected to the propelling vehicle by a ball and socket connection which is locked together in a conventional manner so that the propelling vehicle can control the movement of the trailer through a swivel action which causes the trailer to track behind the propelling vehicle but permits maneuverability when steering around curves, corners, and the like.

Ideally the center of gravity of the combined trailer and the cargo carried thereby should be located slightly forward of the axle of the trailer so that a dead weight load or downward force of approximately 50 to 100 pounds is applied through the ball and socket connection to the propelling vehicle. Loads in excess of this amount not only create an excessive strain on the rear suspension system of the propelling vehicle, but also tend to lift the front of the propelling vehicle so that the steering capability is affected. If the center of gravity of the trailer is located rearwardly of the axle, an upward force is applied to the ball and socket connection which tends to cause such connection to be disengaged. Also an upward force on the ball and socket connection tends to lift the rear of the propelling vehicle and transfer additional weight to the front wheels thereof so that both the steering and driving capabilities of the propelling vehicle are affected.

In order to attain an optimum load factor of the trailer, a relatively simple apparatus is provided which is easily attached to the tongue of a conventional trailer and which measures the actual dead weight load that the combined trailer and cargo apply to the propelling vehicle. Thus, the cargo carried by the trailer can be shifted forwardly or rearwardly until it is located in a position where the center of gravity of the trailer is located properly so that substantially the optimum weight is applied to the propelling vehicle. The apparatus includes a gauge which is directly readable at all times to assist the operator in distributing the cargo on the trailer as it is being loaded.

It is an object of the invention to provide an apparatus which gives a direct continuous reading of the weight distribution of a single axle trailer to assist in loading such trailer in a manner that an optimum dead weight is applied to the connection with a propelling vehicle.

DESCRIPTION OF THE PREFERRED EMBODIMENT

Figure 1:
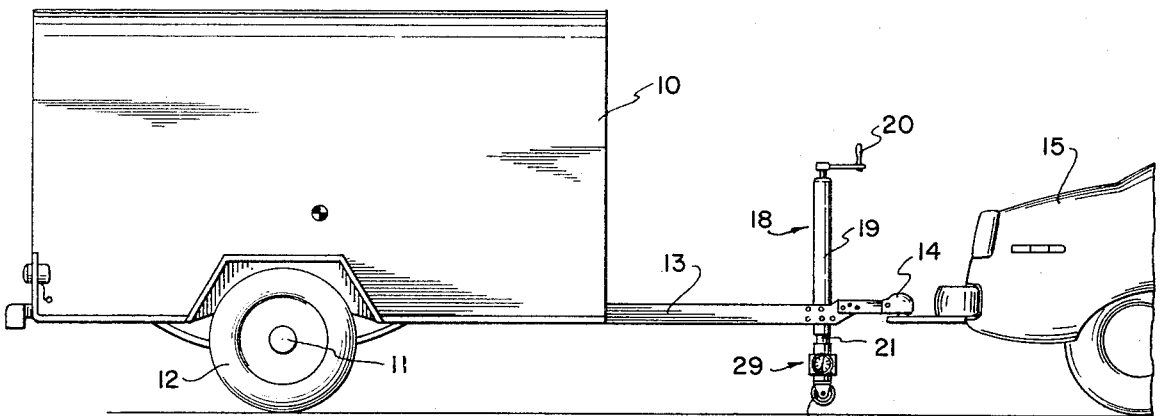
FIG. 1 is a side elevation illustrating one application of the invention.

With continued reference to the drawing, a trailer 10 is provided and such trailer is mounted on a single axle 11 having one or more wheels 12 at each end. The trailer 10 includes a frame to which a tongue 13 is connected and such tongue has a socket 14 engageable with a ball carried by the frame of an automobile or other propelling vehicle 15. Although an enclosed utility trailer has been illustrated, it is noted that a camping trailer, boat trailer, or other type of trailer having a single axle could be used since the structure thus far described is conventional in the prior art and forms no part of the invention.

With reference to FIG. 1, a tongue support member or screw jack 18 is provided having a vertically disposed body 19 which may be temporarily clamped or permanently attached to the tongue 13 of the trailer. An operating crank 20 is mounted at the upper end of the body 19 and a telescoping member 21 extends from the opposite end thereof. A ground-engaging wheel or plate 22 normally is connected to the lower end of the telescoping member 21 so that the tongue of the trailer can be raised and lowered by operating the crank 20. It is noted that any other conventional means for operating the jack, such as a fluid cylinder or a scissors type jack, could be provided for supporting the tongue 13 in raised position when the trailer and the propelling vehicle are separated.

Figure 5:
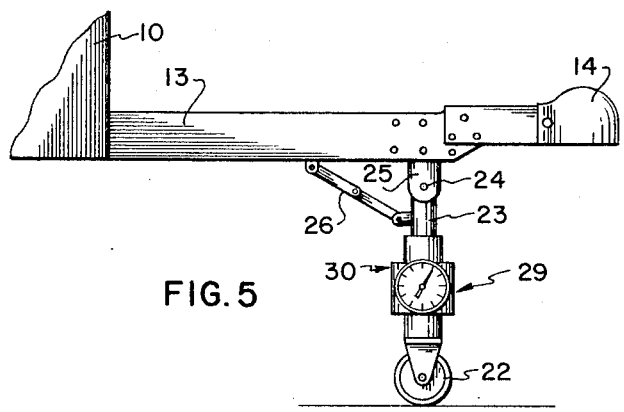
FIG. 5 is a fragmentary side elevation of a modified means for mounting the device on the tongue of the trailer.

With reference to FIG. 5, a support leg 23 may be provided for supporting the tongue of the trailer. In this modification, the leg 23 is connected by a pivot 24 to a pair of lugs 25 carried by the tongue of the trailer so that the leg could be swung from a generally horizontal position to a substantially vertical position when desired and held in such vertical position by a brace 26.

Figure 2:
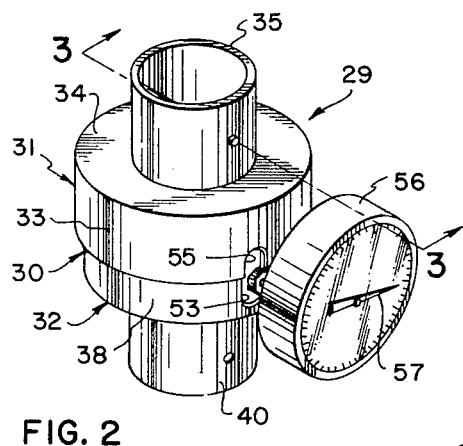
FIG. 2 is a perspective view of the tongue weight measuring device per se.
Figure 3:
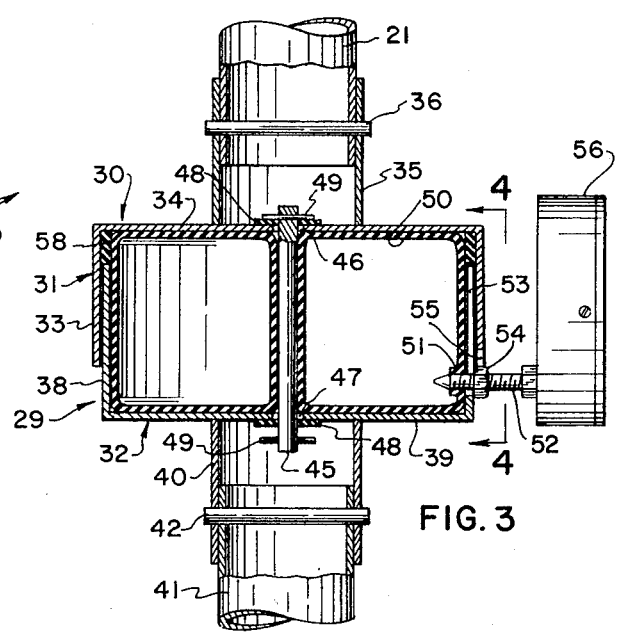
FIG. 3 is an enlarged section on the line 3—3 of FIG. 2.
Figure 4:
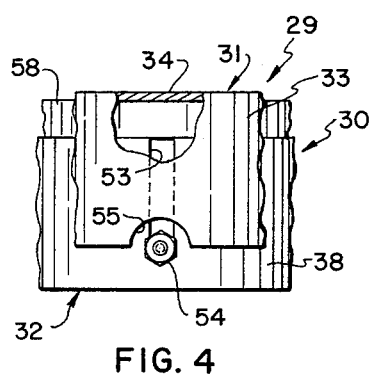
FIG. 4 is a section on the line 4—4 of FIG. 3.

With particular reference to FIGS. 2–4, a trailer tongue dead weight measuring device 29 is provided including a housing 30 having upper and lower telescoping portions 31 and 32, respectively. The upper portion 31 has a generally cylindrical wall 33 which is closed at one end by an upper substantially flat wall 34. An upwardly extending sleeve 35 is fixed to the upper wall 34 and is adapted to receive a portion of the telescoping member 21 to which it is connected by a pin 36.

The lower portion 32 of the housing has a generally cylindrical wall 38 and a lower substantially flat wall 39. The cylindrical wall 38 of the lower portion is of a size to be axially slidably received within the cylindrical wall 33 of the upper portion to permit relative movement therebetween. A downwardly extending sleeve 40 is fixed to the flat wall 39 in a position to receive the upwardly extending mounting stud 41 of the wheel 22 to which it is connected by a pin 42.

In order to limit axial movement of the upper and lower portions in a direction away from each other, a central guide post 45 extends through openings 46 and 47 in the upper and lower flat walls 34 and 39, respectively, and through resilient washers 48 located adjacent to each of such flat walls. A pin 49 extends through each end of the post 45 to prevent accidental separation of the upper and lower portions of the housing 30, particularly when the measuring device is inoperative.

Within the telescoping housing 30 a doughnut shaped pressure cell 50 constructed of flexible resilient material, such as rubber, thermoplastic material, or the like, is mounted. The cell 50 contains either liquid or gaseous fluid under pressure and such cell has an opening 51 within which a hollow stem 52 is sealed. The stem 52 extends through an elongated slot 53 in the cylindrical wall 38 of the lower portion of the housing and preferably such stem is secured in fixed position by a nut 54. The cylindrical wall 33 of the upper portion of the housing is provided with a slot 55 of a size to receive the nut 54 and permit relative movement between the upper portion 31 and the lower portion 32 of the telescoping housing.

A pressure actuated gauge 56 is fixed to the outer end of the stem 52 and communicates with the interior of the pressure cell 50 in such a manner that the indicator 57 of the gauge registers the pressure within the cell 50. If desired, a flexible compression ring 58 can be provided between the upper flat wall 34 and the upper edge of the lower cylindrical wall 38 to prevent damage to the walls of the pressure cell through pinching action.

In the operation of the device, the pressure cell 50 is mounted within the housing 30 and the housing is attached to the tongue support member 18 with the wheel 22 in engagement with the ground. For empty use the trailer is desirably adjusted or weighted to provide proper dead weight load force on the tongue. The pressure cell and, if necessary, auxiliary weights may be used for this purpose. In loaded use the cargo is distributed to provide the proper dead weight force. Since cargo normally is loaded into the front of the trailer first, the indicator 56 initially indicates an excessive weight on the tongue in a downward direction. However, as the rear portion of the trailer is loaded, the indicator returns toward the normal safe load position. When all of the cargo has been loaded onto the trailer, the indicator should be within the safe load range of approximately 50 to 100 pounds dead weight load on the trailer tongue. If the indicator registers more than the desired amount, some of the cargo is shifted rearwardly of the axle 11 to counterbalance the load. If the indicator registers less than the desired amount, the cargo is shifted from the rear of the trailer toward the front, or rearranged so that the heavier portions are located forwardly of the axle until the indicator falls within the safe load range. In this position, the center of gravity of the trailer and cargo is located forwardly of the axle.

After the cargo has been correctly loaded into the trailer, the socket 14 is connected to the ball of the propelling vehicle 15 and the tongue support member 18 is removed from the tongue or retracted to inoperative position by operating the crank 20 or swinging the support leg 23 to a substantially horizontal position. If a portion of the cargo is removed from the trailer, the remaining portion of such cargo is redistributed so that the indicator 57 remains within the safe load range.

It is noted that the weight measuring device 29 registers only the downward force which the trailer tongue applies to the propelling vehicle and does not measure the weight of the cargo being loaded into the trailer or the gross weight of the trailer and cargo. Accordingly, the measuring device 29 remains operative as long as the trailer is separated feom the propelling vehicle and regardless of whether the trailer is empty or fully loaded.

I claim:

1. Apparatus for measuring the dead weight load of a single axle trailer having a tongue, comprising a tongue support member mounted on the tongue of the trailer, a housing carried by said tongue support member between the trailer tongue and the ground, a fluid pressure cell carried by said housing, and gauge means communicating with said fluid pressure cell for registering the amount of pressure applied to said cell.

2. The structure of claim 1 in which said housing includes upper and lower telescoping portions, means connecting said upper and lower portions to permit limited axial movement therebetween, said pressure cell being located within said telescoping housing.

3. The structure of claim 2 including sleeve means extending outwardly from said upper and lower portions of said housing, and means for connecting said sleeve means to said tongue support member.

4. In a single axle trailer having ground-engaging wheels, a tongue at one end of said trailer, means on said tongue for detachably connecting said trailer to a propelling vehicle, and a tongue support member supporting said tongue when the trailer is separated from the propelling vehicle; the improvement comprising apparatus for measuring the dead weight load applied to the tongue support member, said apparatus including a housing having an upper generally cylindrical portion and a lower generally cylindrical portion telescopically connected together, means for limiting the relative movement between said upper and lower portions, a pressure cell located within said housing, a hollow stem extending through said housing into said pressure cell, the outer end of said stem being disposed exteriorly of said housing, a pressure gauge mounted on the outer end of said stem and communicating with the interior of said pressure cell through said stem, and means for connecting said housing to the tongue support member of the trailer, whereby said pressure gauge indicates the dead weight load of said trailer tongue.

* * * * *